United States Patent [19]

Poland et al.

[11] Patent Number: 5,172,314

[45] Date of Patent: Dec. 15, 1992

[54] APPARATUS FOR COMMUNICATING PRICE CHANGES INCLUDING PRINTER AND DISPLAY DEVICES

[75] Inventors: Terrell Poland; Steven Waldron, both of Danbury, Conn.

[73] Assignee: Electronic Retailing Systems International, Wilton, Conn.

[21] Appl. No.: 695,405

[22] Filed: May 3, 1991

[51] Int. Cl.⁵ .............................................. G06F 15/21
[52] U.S. Cl. ................... 364/401; 364/464.01; 235/383
[58] Field of Search ............ 364/400, 401, 464.01; 235/375, 383; 400/68

[56] References Cited

U.S. PATENT DOCUMENTS

| | | | |
|---|---|---|---|
| 4,002,886 | 1/1977 | Sundelin | 235/383 |
| 4,139,149 | 2/1979 | Crepeau et al. | 235/383 |
| 4,500,880 | 2/1985 | Gomersall et al. | 340/825.35 |
| 4,766,295 | 8/1988 | Davis | 235/383 |
| 4,962,466 | 10/1990 | Revesz et al. | 395/153 |

Primary Examiner—Roy N. Envall, Jr.
Assistant Examiner—David Huntley
Attorney, Agent, or Firm—Brumbaugh, Graves, Donohue & Raymond

[57] ABSTRACT

An improved price updating apparatus for use in retail store pricing systems has an input for receiving update data indicative of a product for which a price change is desired and the changed price. The apparatus looks up records in a database relating to store locations, for locations where the product may be found. Where the location has an electronic price display device, preferably connected with the apparatus by a serial data link, the changed price is transmitted to the display device by the serial data link. Where the location has a printed price, the apparatus stores a print job record containing information about the price and the shape and size of printed price. A user is later able to select, one by one, the various shapes and sizes of printed prices, and to print all the records intended for printing at the selected shape and size.

6 Claims, 5 Drawing Sheets

| PRODUCT CODE 50 | ORDER CODE 51 | PRICE 52 |
|---|---|---|
| 33314 | 10234 | .89 |
| 33325 | 10235 | .43 |
| 33336 | 10236 | 1.50 |
| 33419 | 10237 | 1.00 |
| | | |
| | | |
| | | |

| LOCATION CODE 53 | PRODUCT CODE 54 | LABEL TYPE 55 |
|---|---|---|
| 15-5439 | 33314 | 01 |
| 15-5440 | 33419 | 01 |
| ⋮ | ⋮ | ⋮ |
| 23-1231 | 33419 | 02 |
| ⋮ | ⋮ | ⋮ |
| 31-0003 | 33419 | 03 |

| LOCATION CODE 77 | PRODUCT CODE | PRICE | LABEL TYPE 80 |
|---|---|---|---|
| 15-5440 | 33419 | .95 | 01 |
| 23-1231 | 33419 | .95 | 02 |
| | | | |
| | | | |
| | | | |

FIG. 6

APPARATUS FOR COMMUNICATING PRICE CHANGES INCLUDING PRINTER AND DISPLAY DEVICES

This invention relates to systems for pricing foods in retail establishments and more particularly, to such systems for setting prices of goods and automatically displaying the prices at the sites where the goods are presented to the customer.

BACKGROUND OF THE INVENTION

With the trend to self-service marketing of food and grocery, personal care, hardware and other products, control and display of pricing has assumed increasing importance. From the consumer's point of view, it is necessary that he or she be fully and accurately informed of the price of an item selected, at the time of selection, and that the same price is charged at the checkout counter.

The merchant has even more compelling reasons to insure pricing consistency and accuracy at the shelves and at the checkout counter. He or she must satisfy the customers and maintain prices to keep pace with the competition and costs to insure a reasonable profit. The merchant must also comply with the laws pertaining to providing accurate price information to consumers.

The development and widespread use of modern point of sale (POS) terminals at checkout counters, while of obvious benefit in a number of ways to merchant and consumer, has served to focus on the shortcomings of price marking techniques. In commonly employed POS terminals a scanner scans a uniform product bar code, looks up the uniform product code in a database, and charges the corresponding price to the customer.

Until recently, products were either "item priced", i.e. each unit marked with its actual price by stamp or label, or "shelf priced", i.e. the price of a given item is shown by a printed label attached to the shelf adjacent to the item. In some retail settings each item is priced by both means. But both techniques are labor intensive and costly, as well as being subject to a variety of human errors. For example, in stores employing POS terminals with prices set by computer coupled to the terminal, it often occurs that the item or shelf price differs from the price charged at the POS terminal; this may be caused by mismarking, or by failure to update a POS price change at the shelf. A customer confronted with a different price at the POS terminal is understandably annoyed and adverse business or regulatory consequences may follow. Indeed, some states and localities impose penalties upon the event of a POS terminal charging a price differing from that marked on or near the product. Other states and localities require that in any establishment employing POS terminals there must be price information at or near the merchandise, and in some areas the permitted distance between product and price is quite small. In recent years, a number of efforts have been made to join the modern computerized POS system with shelf pricing systems, so that prices indicated at checkout counters are, with high reliability, identically indicated at the shelf at which the product is displayed.

Numerous systems have been proposed for displaying continuously updatable prices in retail stores. The benefits flowing from installation of a viable, workable system would be many. Prices could be displayed for each of the many products for sale, and the price, electronically displayed, could be made to match with high reliability the price generated when the product is scanned by a product code scanner. Sales could be posted, and later cleared, with a minimal labor cost as compared to the common manual method of physically marking and remarking the prices on sale items. Storewide sales, whether tied to day of the week or other events of business importance, could be posted, and later cleared, almost as easily as sales on particular items.

Most proposed electronic pricing systems have suffered, however, from numerous drawbacks. The reliability of some systems has tended to be too low, and the cost too high. Among the most vexing problems is the failure of electronic display technologies to satisfy all the product price markings in a typical retail setting. Many proposed electronic pricing systems offer their intended benefits only if all or nearly all product locations are amenable to installation of electronic price display devices. But experience shows that existing proposed electronic pricing systems, without more, fail to provide their intended benefits where a substantial portion of the products for sale are inconsistent with electronic display devices. For example, some goods are displayed on tags such that no electronic price display device is mechanically compatible with the tags. Other goods cannot enjoy an electronic price display device because no shelf edge (the usual location for an electronic price display device) is nearby, sometimes because no shelf is used. Still other goods are in areas exposed to the elements where an electronic price display device would be damaged with time. Finally, some goods are in multiple locations in a retail store, only some of which are amenable to an electronic price display device, while others of the locations are amenable only to a printed price display, often due to the temporary nature of the location.

When the time comes to change a price, a retail store may post new printed prices that are printed off-site, such as at a central data processing site for the chain to which the retail store belongs. This induces substantial delays because the new printed prices must be physically delivered, and makes it difficult to synchronize the posting of the new printed price with the updating of the electronically displayed price.

It is known, of course, to attach local printers to price display systems, and systems have been proposed wherein the system could send characters to such a local printer to generate a printed price. But no known proposed system handles the complex tasks of coordinating the synchronization of electronic and printed price display changes, of accommodating the many shapes and sizes of printed prices that are desirably used in retail settings, and of queueing printing tasks so that generation of printed prices can be accomplished with only a minimum of user intervention.

SUMMARY OF THE INVENTION

An improved price updating apparatus for use in retail store pricing systems has an input for receiving update data indicative of a product for which a price change is desired and the changed price. The apparatus looks up records in a database relating to store locations, for locations where the product may be found. Where the location has an electronic price display device, preferably connected with the apparatus by a serial data link, the changed price is transmitted to the display device by the serial data link. Where the location has a printed price, the apparatus stores a print job record containing information about the price and the shape and size of printed price. A user is later able to select, one by one, the various shapes and sizes of printed prices, and to print all the records intended for printing at the selected shape and size.

DESCRIPTION OF THE DRAWING

An embodiment of the invention will be described with respect to a drawing, of which:

FIG. 4 shows sample records in a product database;

FIG. 5 shows sample records in a location database;

FIG. 6 shows sample records in a print queue according to one embodiment of the invention;

FIG. 10, which includes

Throughout the figures, like elements have where possible been depicted with like reference designations.

DETAILED DESCRIPTION

Figure 1:
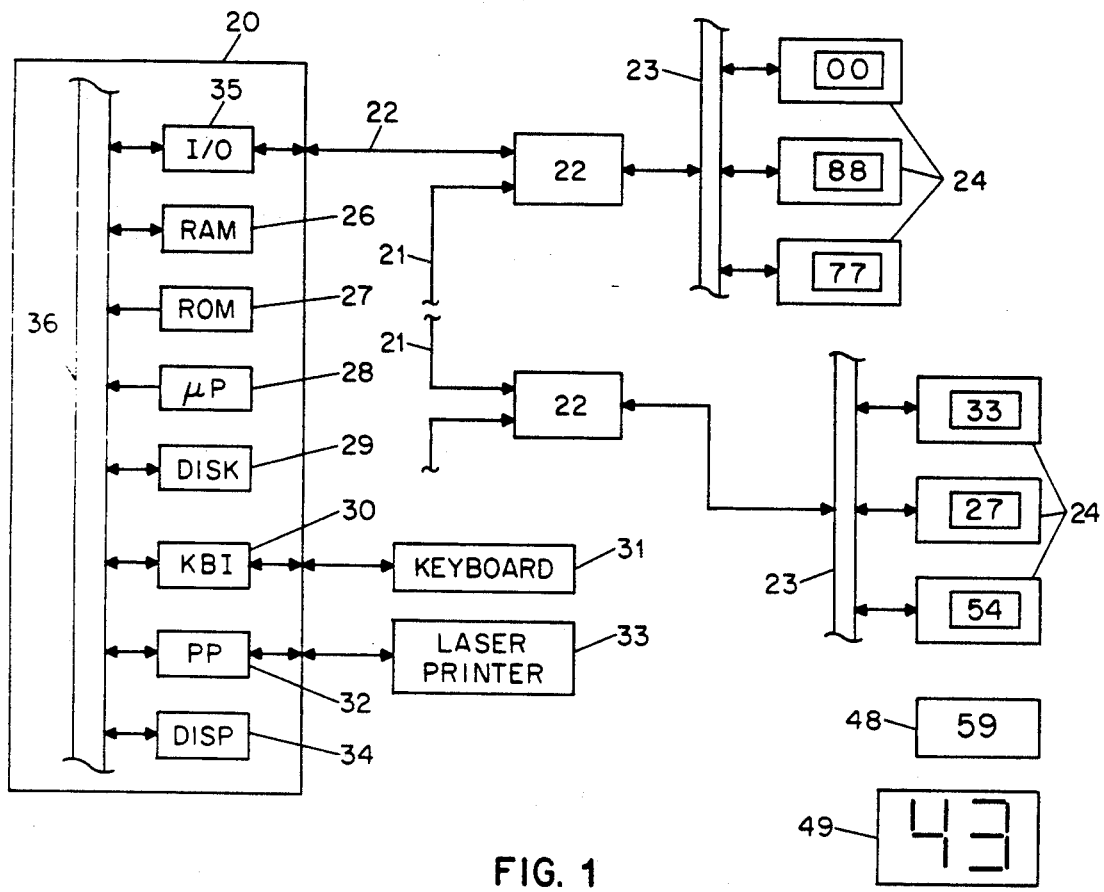
FIG. 1 is a functional block diagram of an exemplary apparatus in accordance with an embodiment of the invention including an electronic price display device 24.

An exemplary embodiment of the invention may be seen in FIG. 1, which shows a data source in the form of a processor 20, linked by serial data link 21 to controllers 22, a plurality of which are installed in the retail store. Serial data link may be hard-wired, as by twisted pair or coaxial cable, or may preferably be a spread-spectrum link in the 800 or 900 MHz regions of the RF spectrum. Each of the controllers 22 communicates by serial bus 23 to a plurality of electronic display devices 24. Serial bus 23 is preferably carried in rails (not shown separately in FIG. 1) along the aisle edge of shelves that hold merchandise. Electronic display devices 24 are preferably made to snap onto the rails for both mechanical security and connection to the serial bus 23. Processor 20 comprises serial I/O port 35, one of many devices on internal address/data bus 36. Also on bus 36 are RAM 26, ROM 27, a microprocessor 28, a disk or other substantially nonvolatile mass storage device 29, a keyboard interface 30, a parallel printer port 32, and a display 34. Keyboard interface 30 connects with keyboard 31, and a laser printer 33 connects with the parallel port 32. The contents of data storage devices RAM 26, ROM 27, and disk 29 are omitted from FIG. 1 for clarity, but are discussed at length below.

Controllers 22 may be daisy-chained with successive serial links 21, in which case each controller 22 passes along the chain any messages intended for other controllers 22 located further along the chain. An addressing convention is established so that each of the display devices may be uniquely addressed by the processor 20 through one or another of the controllers 22. Also in the addressing convention is a set of global messages, to be received by all or some of the controllers 22 or by all or some of the display devices 24.

For completeness in FIG. 1 there are also shown exemplary printed price tags 48 and 49, differing in size and shape. Tags 48 and 49 are physically located nearby to selected retail products, not shown in FIG. 1. Tags 48 and 49 may be printed or reprinted by laser printer 33 and then conveyed by manual means to their ultimate destinations.

Figure 2:
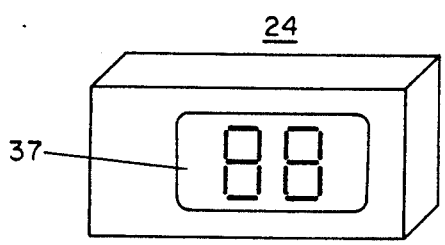
FIG. 2 is a perspective view of the electronic price display device 24.

Turning now to FIG. 2, an electronic price display device 24 is shown in perspective view, including display screen 37, preferably a liquid crystal display screen. Not shown in FIG. 2 are rear-mounted mechanical members and electrical contacts for mechanical security to a rail and for electrical connection to the rail.

Figure 3:
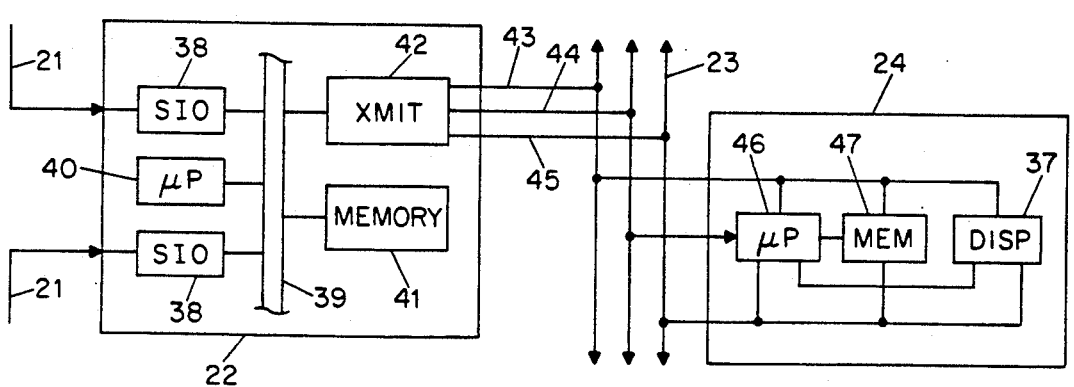
FIG. 3 shows in somewhat greater detail the serial link between controller 22 and an exemplary electronic price display device 24.

FIG. 3 shows in greater detail a preferred arrangement for connections between controllers 22 and display devices 24. Controller 22 has serial I/O interfaces 38 connected to serial lines 21, and the serial I/O interfaces 38 each connect with internal address/data bus 39, which supports microprocessor 40. Memory 41 provides a stored program for execution by microprocessor 40, and optionally contains nonvolatile RAM for storage of selected price data. Serial transmitter 42, when directed to do so by microprocessor 40, sends messages over serial bus 23 to display devices 24.

The shelf-rail serial bus 23 is composed preferably of a power line 43, ground line 45, and data line 44. Display device 24 shown in FIG. 3 is typical of the thousands or tens of thousands of display devices 24 in a retail store. Each display device 24 receives and filters power from lines 43 and 45, energizing microprocessor 46, memory 47, and display 37. In one embodiment memory 47 is an ordinary volatile RAM, while in another embodiment memory 47 is a nonvolatile RAM the contents of which are protected by a cell or battery located in the display device 24 but omitted for clarity in FIG. 3. Microprocessor 46 monitors all serial data on the data line 44, which according to a predetermined protocol is grouped in packets. A packet usually includes an address, a message type identifier, and data. If the microprocessor 46 of one particular display device 24 encounters a data packet on line 44 with an address matching that of the particular one display device 24, then the microprocessor 46 stores the data of the packet in memory 47. If the received data is price data, the price shown on display 37 is updated.

FIG. 4 shows a database 53 in the processor 20 having a record for each product. In an exemplary embodiment of the database 53, each record has fields for product code 50, for an order code 51, and for price 52. Product code 50 is preferably the Uniform Product Code which is standardized throughout the retailing industry, while the order code 51 is typically unique to a particular retailer.

FIG. 5 shows a database 56 in the processor 20 having a record for each store location where a product may be found. Each such location needs to have a posted price, but in the system according to the invention some of the locations may be served by electronic display devices 24, while others of the locations may served by printed price tags 48, 49. In FIG. 5 the label type field 55 carries codes which show this. Arbitrarily, 3 could represent an electronic display device 24 while 01 and 02 could represent printed price tags 48 and 49 respectively.

It will be noted that the number of records in database 56 may exceed the number in database 53. For example, a particular product may appear in more than one store location, such as on a regular shelf location and on an aisle end cap. In FIG. 5 this possibility is suggested by the three records having a product code of 33419. The three records have differing locations 53, and differing label types 55.

Databases 53 and 56 may be in RAM 26, or in disk or other mass storage device 29.

Price updating in a retail store having only physical price markings (e.g. lacking any type of electronic display device for prices) is a labor-intensive, error-prone task. It is done as rarely as possible so avoid the attendant costs and errors.

Figure 7:
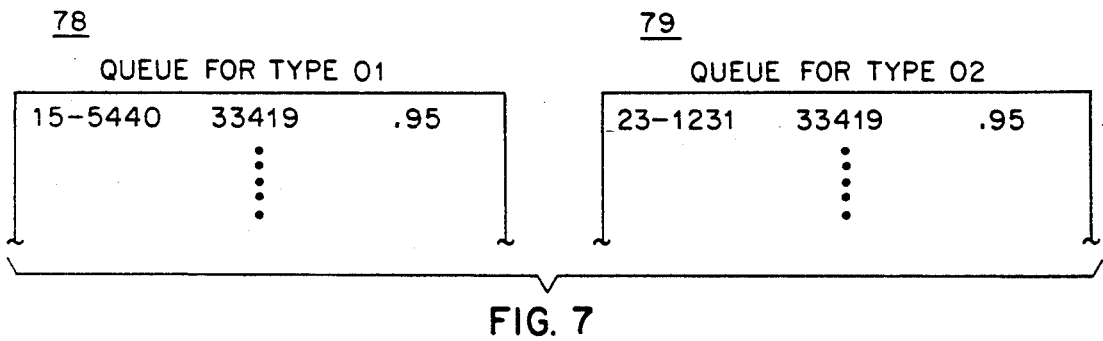
FIG. 7 shows sample records in a print queue according to an alternative embodiment of the invention.

In a retail store having prior art electronic display devices, the price change information from chain management is made available to a central control device and is then communicated to the electronic display devices. Unfortunately, in some prior art systems no attention is paid to the portion of products for which no electronic display device is used or feasible. Replacement paper labels are prepared by chain management and shipped to the retail store. Time lags necessarily arise, as do the odds of the occasional mismatch between what was printed and what is later communicated by the price change information. According to the invention, print queuing steps resulting in queues such as those in FIGS. 6 and 7 permit more controlled and coordinated price changes; FIGS. 6 and 7 will be discussed further below.

Figure 8:
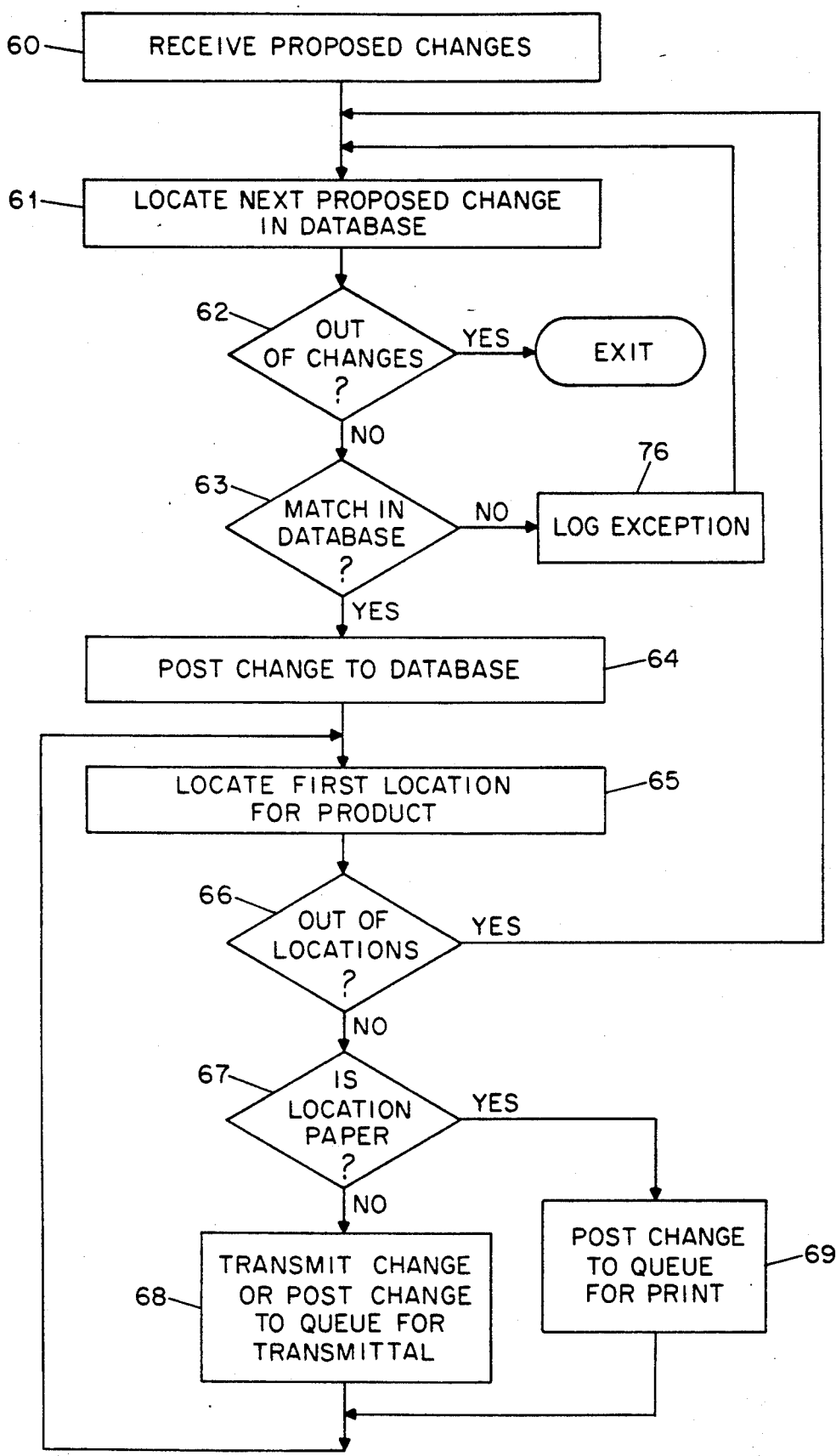
FIG. 8 shows in flowchart form the steps performed in a price change posting session.

FIG. 8 shows in simplified flowchart form the steps giving rise to the queues of FIG. 6 and 7. Proposed price changes are received by the apparatus in block 60. Generally the price changes are received from chain management, although locally initiated changes may also be accommodated. The changes may be received by floppy disk or by modem transmission, or by other means.

Under stored program control, microprocessor 28 in turn performs the steps shown in the remainder of the figure. The first (or next) of the proposed price changes is located in block 61. If all the price changes have been handled (e.g. an end-of-file character is encountered) then the test of block 62 leads to an exit. Otherwise execution proceeds to block 63, where a test is made to determine whether a product can be found in the database 53 that matches the product for which a price change has been proposed. If no match can be found, an exception can be noted as in block 76. Alternatively, the exception condition may be ignored. In block 64, the changed price is posted to the database, changing the contents of field 52 for the matching record.

Next database 56 is inspected to find a location where the product may be found for which a price change is proposed. If all locations of the database 56 have been checked, control returns to block 61, otherwise the location is handled further. A test is made at block 67 to classify the label type 55 as electronic or paper. If the label is electronic, then in block 68 the change is transmitted to the associated label 24, the physical or logical address is found in the location code 53. As mentioned above, the addressing plan gives a unique location code to each location where a price may be needed, and the addressing plan also defines addresses for physical, printed labels.

Depending on the tasks to be performed the computer 20 may preferably queue up numerous messages for display devices 24 for transmission at a later time.

If the label is paper, then in block 69 information sufficient to completely define the contents of a print label is queued to a database.

Returning to FIG. 6, there is shown an embodiment of the print queue 77. In this embodiment each record represents a label to be printed, and the various labels to be printed are intermingled as to size and shape. A field 80 indicates the label size and shape. In FIG. 7, on the other hand, there is shown an embodiment in which all label tasks for a label type arbitrarily assigned the number 01 are posted to a respective queue 77, while all label tasks for a label type arbitrarily assigned the number 02 are posted to a respective queue 78.

In a price change session, the queue for label printing rows until all change data have been processed. A human operator may then select a print option routine as shown in flowchart form in FIG. 9. The operator begins at initialization block 70. At block 71 it is determined which label type is to be printed next. Preferably the stored program will suggest a label type to the operator, but will also accommodate a request by the operator that a particular label type be printed. If the printer 33 has enough trays, it may be possible for the system to select the print stock without the requirement of user assistance. In must systems, however, it will sometimes be necessary to remove one stock and load another, at the conclusion of which the operator responds to a prompt in block 72.

FIG. 10 shows a number of examples of label stock applications giving rise to the above-mentioned requirement that the system accommodate a variety of labels. FIGS. 10(a), 10(b), 10(c), and 10(d) show electronic price display devices, and FIGS. 10(e) and 10(f) show non-electronic price tags. Of the electronic price display devices shown, three of them (10(a), 10(c), and 10(d)) have an adhesive printed overlay label 101 affixed on and around the display device on the plastic housing of the device.

Figure 10A:
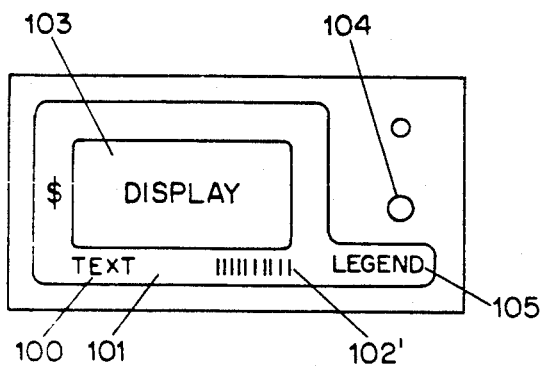
FIGS. 10(a)-10(f), shows typical labels and overlays printed during a print session.
Figure 10B:
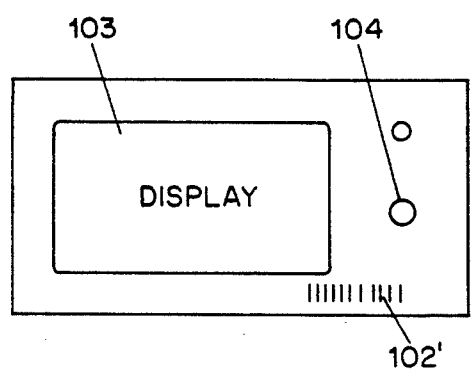
Figure 10C:
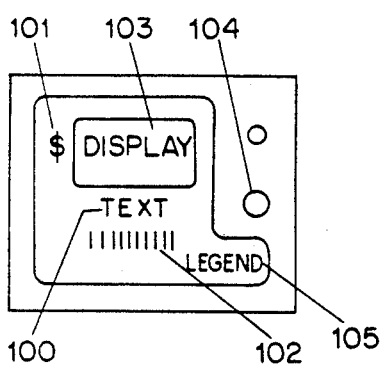
Figure 10D:
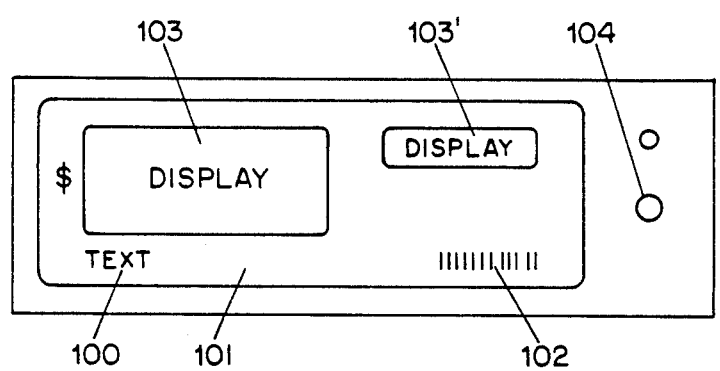

Each of the price tags has a price area (103 in the electronic tags, 106 in the print tags) and a bar code (a changeable bar code 102 on a printed tag or overlay, or a fixed unchangeable bar code 102' on the tag of FIG. 10(b)). Each electronic tag has a pushbutton 104 which can invoke a preprogrammed function such as displaying the unit price. Legend 105, if provided, explains the function of pushbutton 104.

Each tag also has text information 100, preferably including enough information to permit the consumer to uniquely identify the product associated with the tag; this information also assists the store employee restocking the shelves in properly facing and positioning the products.

Figure 10E:
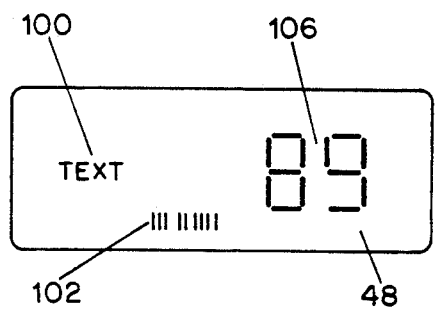
Figure 10F:
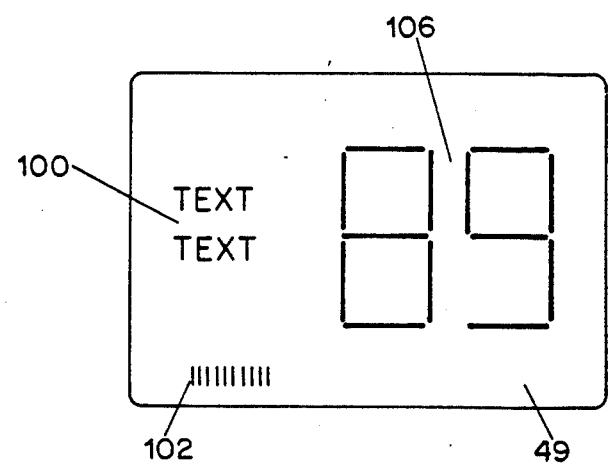

Nonelectronic tags of FIGS. 10(e) and 10(f), also shown as 48 and 49 in FIG. 1, have price field 106 as mentioned above.

The stock provided by the operator to the laser printer 33 differs over the six tag and overlay types of FIG. 10, and the label types 55 are defined to correspond to the tag and overlay types. Where a proposed change goes only to price, there is no need to update the text 100 and thus the overlays of FIGS. 10(a), 10(c), and 10(d) would not require reprinting and would not give rise to a queued print command. Where a proposed change goes to product description, such as the text 100, then the overlays would give rise to queued print commands.

The stock provided by the operator to the laser printer 33 for the six tag and overlay types of FIG. 10 varies. For the overlays, it is a gummed plastic or plastic-coated label with die-cut openings and outlines. For the labels 48 and 49, it may be gummed stock or card stock. In the case of gummed stock the adhesive must be selected to withstand the fuser roller temperature in the laser printer.

Returning now to FIG. 9, a label type having been selected, the system examines the label print queue for labels of the current type. If the queue 53 of FIG. 6 is employed, the system goes from record to record seeking a match on the label type field 80. On the other hand, if the queues 78, 79 of FIG. 7 are employed, the system uses only the queue 78 or 79 for the current data type, and simply takes up the next record therein.

At block 74 a test for exhaustion of the queue, as by check for an end-of-file character. On the other hand, if a next matching record was found, then in block 75 a label is printed. Control returns to block 73.

Figure 9:
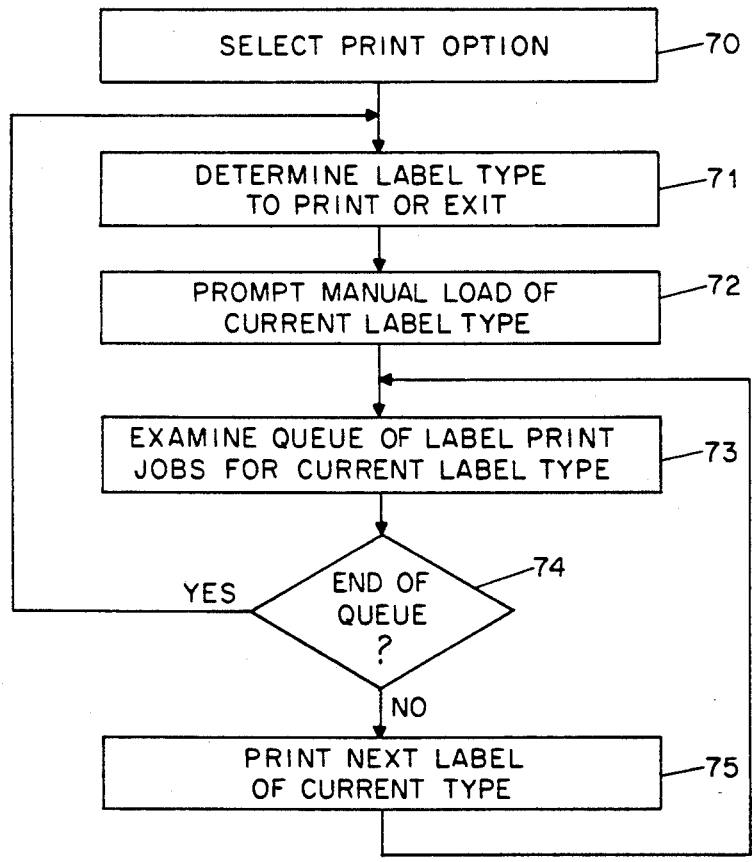
FIG. 9 shows in flowchart form the steps performed in a print session following a price change session.

Repetition of the steps of FIG. 9 permit printing of all the labels in the queue. It will be appreciated that the print session of FIG. 9 would generally closely follow the price-change session of FIG. 8, but that the two could be separated by some time. For example, the price-change session could occur at night at a time when data rates are low, while the print session could occur during normal business hours to minimize the labor cost of loading the printer stock and the related manual tasks.

The stored programs of FIGS. 8 and 9 may be stored in memory 26, in ROM 27, or in disk or other mass storage device 29.

By means of the above-described system, a fully integrated price-display system is provided—a system that smoothly accommodates both electronic price display devices and print price messages.

It will be appreciated by those skilled in the art that changes and modifications of an obvious nature could be made to the disclosed embodiment without deviating from the scope of the invention as defined by the claims. For example, instead of microprocessors executing stored programs, random logic as discrete components or application-specific integrated circuits could provide the system elements described above.

What is claimed is:

1. Price updating means for use in a price display system including both individually addressable information display devices and printed price indicators disposed to display prices, and having a data source, a communications channel connecting said data source with said information display devices, and a printer connected to the data source, said printer disposed to print said printed price indicators in response to print commands, the data source comprising a first data file of records corresponding to product locations, each record containing product information indicative of the product associated with the location corresponding thereto, each record also containing information indicative of whether the location corresponding thereto is associated with an information display device or with a printed price indicator, the price updating means comprising:

input means for receiving update data indicative of a product for which a price change is desired and the changed price therefor;

lookup means responsive to the update data for looking up among records in the first data file those matching records, if any, for which the product information matches the product for which a price change is desired;

first posting means responsive to a matching record having information indicative of its respective location being associated with an information display device, for posting the changed price to the associated information display device;

queueing means responsive to a matching record having information of its respective location being associated with a printed price indicator, for storing a print command capable of causing the printer to print a printed price indicator illustrative of the changed price; and means responsive to said stored print command to activate said printer to print the price indicator.

2. The price updating means of claim 1, wherein the data source further comprises a second data file of records corresponding to products, each record containing product information indicative of the corresponding product, and price information indicative of the price associated with the product corresponding thereto, the price updating means further comprising:

second posting means responsive to the update data for locating the record, if any, for which the corresponding product matches the product for which a price change is desired, and for posting to the record the changed price.

3. The price updating means of claim 2 wherein the electronic price display devices of the price display system are mounted in housings adapted to receive respective printed overlays, each of which includes at least a portion of the related product information in said second data file, said price updating means further comprising:

means responsive to selection of a record in said second data file to activate said printer to print a label including said portion of the related product information.

4. The price updating means of claim 3 wherein said information display devices are mounted in housings of a plurality of different sizes and shapes and wherein said second data file includes data specifying the size and shape of the housing associated with each product, whereby upon activation, said printer prints labels of size and shapes corresponding to the respective display device housings.

5. The price updating means of claim 1, wherein the printed price indicators are of a plurality of sizes, and each record in the first data file associated with a printed price indicator further comprising information indicative of the size of the associated printed price indicator, the queueing means of the price updating means further comprising:

means responsive to a matching record having information of its respective location being associated with a printed price indicator, for storing in the print command information indicative of the size of the associated printed price indicator, and means responsive to selection by a user of a size of printed price indicator for providing to the printer print commands for which the information indicative of the size of the associated printed price indicator matches a the selected size.

6. The price updating means of claim 1 wherein the printer of the price display system is a laser printer.

* * * * *